United States Patent
Chun

(10) Patent No.: US 9,286,213 B2
(45) Date of Patent: Mar. 15, 2016

(54) METHOD AND APPARATUS FOR MANAGING FILE SYSTEM

(71) Applicant: Electronics and Telecommunications Research Institute, Daejeon (KR)

(72) Inventor: Han Sung Chun, Daejeon (KR)

(73) Assignee: ELECTRONICS AND TELECOMMUNICATIONS RESEARCH INSTITUTE, Daejeon (KR)

( * ) Notice: Subject to any disclaimer, the term of this patent is extended or adjusted under 35 U.S.C. 154(b) by 197 days.

(21) Appl. No.: 14/030,455

(22) Filed: Sep. 18, 2013

(65) Prior Publication Data

US 2014/0082031 A1  Mar. 20, 2014

(30) Foreign Application Priority Data

Sep. 20, 2012  (KR) .................. 10-2012-0104410

(51) Int. Cl.
*G06F 7/00* (2006.01)
*G06F 17/30* (2006.01)
*G06F 12/02* (2006.01)

(52) U.S. Cl.
CPC ........ *G06F 12/0253* (2013.01); *G06F 12/0246* (2013.01); *G06F 17/30218* (2013.01)

(58) Field of Classification Search
None
See application file for complete search history.

(56) References Cited

U.S. PATENT DOCUMENTS

| | | | |
|---|---|---|---|
| 5,341,339 A * | 8/1994 | Wells | 365/185.11 |
| 5,630,093 A * | 5/1997 | Holzhammer et al. | 711/115 |
| 5,937,425 A | 8/1999 | Ban | |
| 2003/0229753 A1 | 12/2003 | Hwang | |
| 2010/0125696 A1* | 5/2010 | Kumar et al. | 711/103 |
| 2011/0138117 A1* | 6/2011 | Nakamura et al. | 711/103 |
| 2011/0191521 A1* | 8/2011 | Araki et al. | 711/103 |
| 2012/0166709 A1 | 6/2012 | Chun | |

FOREIGN PATENT DOCUMENTS

KR  2003-0095438  12/2003
KR  10-2012-0072228  7/2012

* cited by examiner

*Primary Examiner* — Uyen Le
(74) *Attorney, Agent, or Firm* — Kile Park Reed & Houtteman PLLC

(57) ABSTRACT

A file management system for managing a file using a logical erase block (LEB) corresponding to a physical erase block (PEB). The file management system includes a free LEB list storing a free LEB allowing writing on all pages; a dirty LEB list storing a dirty LEB that is not the free LEB; and an obsolete area determining module determining an obsolete area in at least one dirty LEB, by referring to a block table storing information about whether or not at least one block is being used and according to whether or not the at least one dirty LEB is mapped to a PEB.

16 Claims, 4 Drawing Sheets

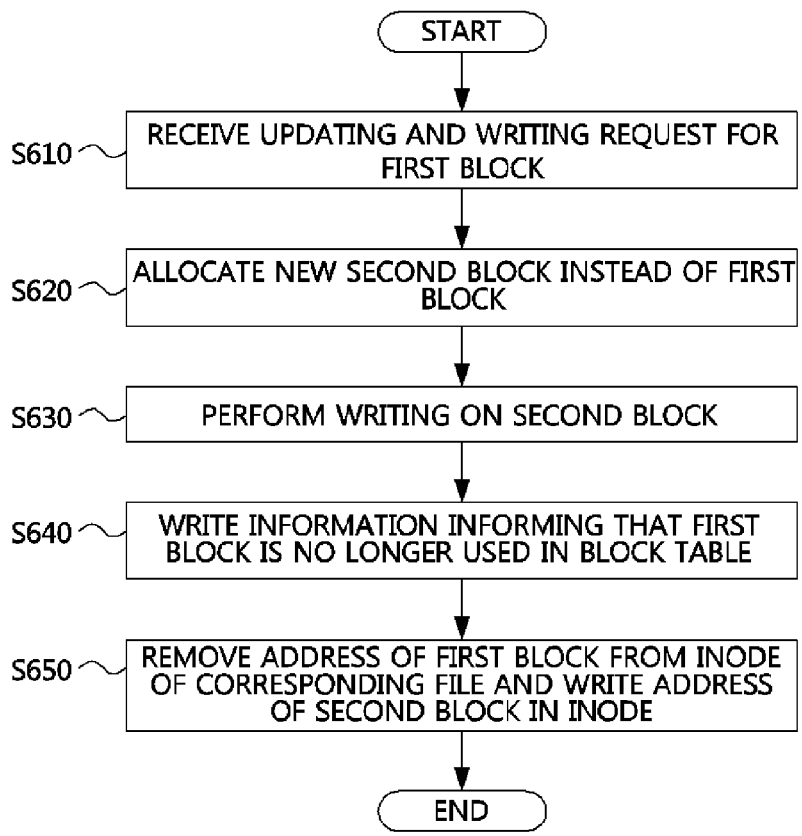
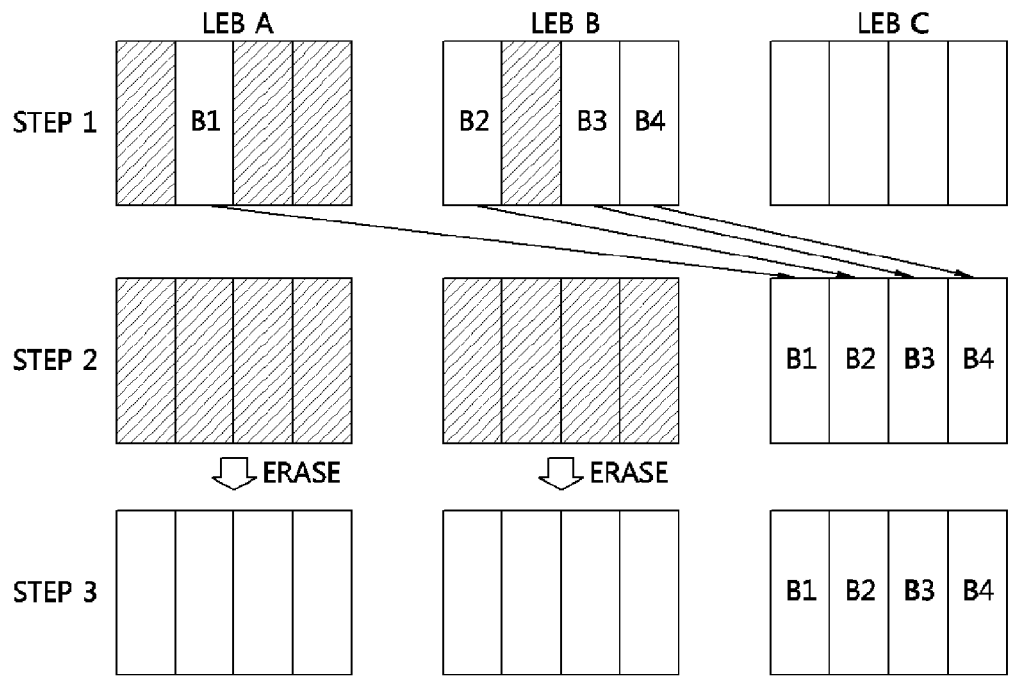

METHOD AND APPARATUS FOR MANAGING FILE SYSTEM

CLAIM FOR PRIORITY

This application claims priority to Korean Patent Application No. 10-2012-0104410 filed on Sep. 20, 2012 in the Korean Intellectual Property Office (KIPO), the entire contents of which are hereby incorporated by reference.

BACKGROUND

1. Technical Field

Example embodiments of the present invention relate in general to a method and apparatus for managing a file system, and more specifically, to a method and apparatus for managing a file system in order to store data in a memory of an embedded system.

2. Related Art

Content stored in a file system that is widely used in various kinds of mobile devices, such as a computer and a smart phone, can be largely classified into data and metadata. Data is content constituting a file, and metadata is additional information about the file, e.g., a file name, access rights, a file modification time, and the locations of chunks constituting the file.

Various kinds of memories may be used for a file system, and a NAND flash memory, among various kinds of memories for a file system, is widely used as a storage device for an embedded system, since it can be manufactured at low cost, has a small size, and is shock-resistant. The NAND flash memory has properties that are significantly different from those of a disk.

A NAND flash memory is constituted with several erase blocks, and each erase block is constituted with several pages. The size of a page may be 2 KB, and an erase block may be constituted with 64 pages corresponding to 128 KB.

A flash memory is capable of reading, writing, and erasing data. Reading/writing is performed in units of pages, and in order to rewrite data on a page on which writing has already been performed, it is needed to all erase an erase block to which the page belongs. Erasing an erase block consumes a longer time than reading/writing. Also, each erase block has a limit to the number of times erasing is allowed, and if an erase block has been erased the maximum number of times, then the erase block can be no longer used. Such a disabled erase block is called a "bad block". If a bad block appears in a flash memory, the memory can no longer function as a storage device, since it is difficult to process the bad block and an available space of the flash memory is reduced by the size of the bad block. Accordingly, in order to expand the lifespan of a flash memory, a technique for evenly wearing out erase blocks so that bad blocks appear as late as possible is needed. The technique is called "wear-leveling".

In the case of a flash memory, it is undesirable to rewrite data at a specific location of a file, even when partially correcting data written at the specific location. The reason is because the erase blocks must all be erased and the data rewritten, which takes a long time and significantly deteriorates performance. Also, even in the case of correcting only one page, all the erase blocks must be rewritten, resulting in many erasing operations and reducing the lifespan of the flash memory. Accordingly, it is preferable that the flash memory uses a method of writing corrected data in a different location, not where the original data is located, which is called "out-of-place update".

Meanwhile, in the case of a disk, in order to correct data located in a specific area, it is only necessary to rewrite corrected data in the corresponding area, not to perform a process of erasing and then rewriting as in a flash memory. That is, a disk allows in-place update.

As such, since a flash memory and a disk have different properties, they use different file systems configured to be suitable to their properties. A representative flash file system for a flash memory is a log-structured file system, such as a journaling flash file system (JFFS2), a yet another flash file system (YAFTS2), and the like.

File systems based on the log-structured file system consider a storage space to be a log. That is, the file systems add data to be recorded in the log whenever receiving the data to be recorded. Data is recorded in units of a predetermined length (for example, in units of pages), and the predetermined length for recording is called a "node". When data to be recorded is corrected data corresponding to previously written data, that is, when a node exists in a log, another node is added to the log without correcting the written data. In other words, the file systems operate based on out-of-place update.

Accordingly, the log-structured file system has improved writing performance through the out-of-place update, and helps expand the lifespan of a flash memory. However, the previous data remains and occupies a storage space. This storage space should be retrieved to record other data therein. The previous data remaining due to out-of-place update is called "garbage", and a process of detecting obsolete areas filled with garbage and ensuring available space is called "garbage collection".

Meanwhile, in the log-structured file system, both data and metadata are recorded in a log in units of nodes. That is, like data, metadata is also scattered and stored. In order to access data of a file, metadata of the file is needed, however, it is difficult to know where the metadata is located since the metadata has been scattered and stored. Accordingly, in order to find the metadata, the entire flash memory should be scanned. However, since it is impossible to scan an entire flash memory whenever metadata is required, the entire area of a flash memory is read and metadata information is configured in the flash memory when the file system is mounted. However, this requires a long mount time and large memory consumption since all metadata should be stored in the flash memory. Furthermore, since the mount time and required memory space increase in proportion to the size of a flash memory, a scalability problem becomes significant as the size of a flash memory increases.

Representative disk file systems include ext2, ext3, and the like, which have been used for a long time in Linux. Since a disk allows in-place update as described above, the structure of a disk file system is different from that of a flash file system. Generally, metadata is stored in a specific head area of a storage space. That is, since the location of metadata in a file is known, metadata can be easily read as necessary. That is, it is unnecessary to maintain all metadata in a flash memory, and accordingly, a disk file system achieves a short mount time and small memory consumption.

Due to these advantages, using a disk file system in a large-scale flash memory can be considered, however, the disk file system also has many problems since it has been designed without considering the properties of the flash memory. That is, the disk file system has low writing performance due to in-place update, and includes no component for processing bad blocks.

As described above, if a disk file system for fixing metadata in a specific area of a storage space is used in a NAND flash memory, there are advantages of a short mount time and small memory consumption are obtained, but there are also disadvantages of the flash memory rapidly wearing out and its writing speed deteriorating.

SUMMARY

Accordingly, example embodiments of the present invention are provided to substantially obviate one or more problems due to limitations and disadvantages of the related art.

Example embodiments of the present invention provide a file management apparatus for processing data writing to be suitable for a flash memory while maintaining a data storage structure of a disk file system.

Example embodiments of the present invention also provide a file system management method for processing data writing to be suitable for a flash memory while maintaining a data storage structure of a disk file system.

In some example embodiments, an apparatus for managing a file using a logical erase block (LEB) corresponding to a physical erase block (PEB) includes: a free LEB list storing a free LEB allowing writing on all pages; a dirty LEB list storing a dirty LEB that is not the free LEB; and an obsolete area determining module determining an obsolete area in at least one dirty LEB, by referring to a block table storing information about whether or not at least one block is being used, and according to whether or not an LEB is mapped to a PEB.

The apparatus may further include a garbage collecting module collecting garbage for at least one dirty LEB included in the dirty LEB list, according to the result of the determination of the obsolete area.

The garbage collecting module may classify blocks included in the at least one dirty LEB included in the dirty LEB list into an obsolete area and a valid area, copy the valid area to another free LEB, erase the at least one dirty LEB which has only the obsolete area remained, and move the at least one dirty LEB to the free LEB list.

The garbage collecting module may release mapping between an LEB including an existing obsolete area, moved to the free LEB list, and a PEB.

The apparatus may further include a block allocating module sequentially providing available blocks based on the free LEB list, and moving an LEB having no available space to the dirty LEB list.

The apparatus may further include a write module to which is allocated, if an update write request for a first block is received, a new second block instead of the first block from the block allocating module, and writing information indicating that the first block is no longer used, in the block table, wherein the first block is a block which has already been allocated and the new second block is a newly allocated block.

The obsolete area determining module may check whether individual blocks constituting a dirty LEB are being used by referring to the block table, and if a block is not being used, the obsolete area determining module may determine the block as an obsolete block, and if a block is being used, the obsolete area determining module may determine the block as a valid block.

The block table may be stored in a metadata storage area.

The number of PEBs included in a physical memory may be greater than or equal to the number of LEBs.

Each PEB may include an erase counter including information regarding the number of times that the corresponding PEB has been erased, and the erase counter may be used for wear-leveling by an LEB layer.

In other example embodiments, a method of managing a file system using a logical erase block (LEB) corresponding to a physical erase block (PEB) includes: determining an obsolete area in at least one dirty LEB, by referring to a block table storing information about whether or not at least one block is being used, and according to whether or not the at least one dirty LEB is mapped to a PEB; and performing garbage collection for the at least one dirty LEB according to the result of the determination of the obsolete area, wherein the free LEB is an LEB allowing writing on all pages, and the dirty LEB is an LEB that is not a free LEB.

The performing of the garbage collection for the at least one dirty LEB may include: classifying blocks included in the at least one dirty LEB included in the dirty LEB list into an obsolete area and a valid area, copying the valid area to another free LEB, erasing the at least one dirty LEB which has only the obsolete area remained, and moving the at least one dirty LEB to the free LEB list.

The method may further include releasing mapping between an LEB including an existing obsolete area, moved to the free LEB list, and a PEB.

The method may further include, if an update write request for a first block is received, allocating a new second block instead of the first block, and writing information indicating that the first block is no longer used, in the block table, wherein the first block is a block which has already been allocated and the new second block is a newly allocated block.

The determining of the obsolete area for the at least one dirty LEB may include: checking whether individual blocks constituting a dirty LEB are being used by referring to the block table; and determining a corresponding block as an obsolete block if the block is not being used, and determining the block as a valid block if the block is being used.

According to the embodiments of the present invention as described above, by correcting a writing method while maintaining a data storage structure of a disk file system in which metadata is stored in a fixed location, out-of-place update is allowed.

Also, it is possible to prevent deterioration of writing speed while maintaining advantages of a short mount time and small memory consumption.

BRIEF DESCRIPTION OF DRAWINGS

Example embodiments of the present invention will become more apparent by describing in detail example embodiments of the present invention with reference to the accompanying drawings, in which:

FIG. 6 is a flowchart illustrating an update write operation according to an embodiment of the present invention; and FIG. 7 is a conceptual view for describing the garbage collection.

DESCRIPTION OF EXAMPLE EMBODIMENTS

Figure 1:
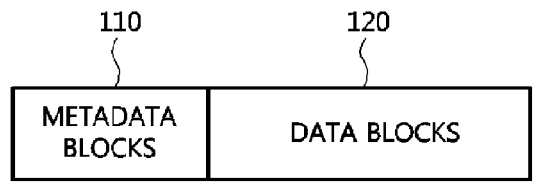
FIG. 1 is a block diagram illustrating a file system according to an embodiment of the present invention.

Example embodiments of the present invention are disclosed herein. However, specific structural and functional details disclosed herein are merely representative for purposes of describing example embodiments of the present invention, however, example embodiments of the present invention may be embodied in many alternate forms and should not be construed as limited to example embodiments of the present invention set forth herein.

Accordingly, while the invention is susceptible to various modifications and alternative forms, specific embodiments thereof are shown by way of example in the drawings and will herein be described in detail. It should be understood, however, that there is no intent to limit the invention to the particular forms disclosed, but on the contrary, the invention is to cover all modifications, equivalents, and alternatives falling within the spirit and scope of the invention. Like numbers refer to like elements throughout the description of the figures.

The terminology used herein is for the purpose of describing particular embodiments only and is not intended to be limiting of the invention. As used herein, the singular forms "a", "an" and "the" are intended to include the plural forms as well, unless the context clearly indicates otherwise. It will be further understood that the terms "comprises", "comprising,", "includes" and/or "including", when used herein, specify the presence of stated features, integers, steps, operations, elements, and/or components, but do not preclude the presence or addition of one or more other features, integers, steps, operations, elements, components, and/or groups thereof.

Unless otherwise defined, all terms (including technical and scientific terms) used herein have the same meaning as commonly understood by one of ordinary skill in the art to which this invention belongs. It will be further understood that terms, such as those defined in commonly used dictionaries, should be interpreted as having a meaning that is consistent with their meaning in the context of the relevant art and will not be interpreted in an idealized or overly formal sense unless expressly so defined herein.

Hereinafter, embodiments of the present invention will be described in detail with reference to the appended drawings. In the following description, for easy understanding, like numbers refer to like elements throughout the description of the figures, and descriptions of elements will only be given once.

FIG. 1 is a block diagram illustrating a file system according to an embodiment of the present invention.

The file system is managed in units of blocks. That is, a storage space according to the present invention may be segmented in units of blocks having a predetermined size (for example, 1 KB, 2 KB, or 4 KB), and accordingly, the storage space may be considered as a group of successive blocks. Accordingly, in this disclosure, the term "block" refers comprehensively to a unit of a storage space capable of having various sizes.

As illustrated in FIG. 1, a specific block area is allocated to metadata blocks 110 and fixedly used, and another block area is allocated to data blocks 120 for storing data.

According to an embodiment, there is metadata corresponding to a file, and in this disclosure, metadata corresponding to a file is referred to as an "Mode". An Mode stores numbers of blocks belonging to a file.

The metadata blocks 110 include information representing whether or not blocks are being used, and in this disclosure, the information is referred to as a "block table".

Figure 2:
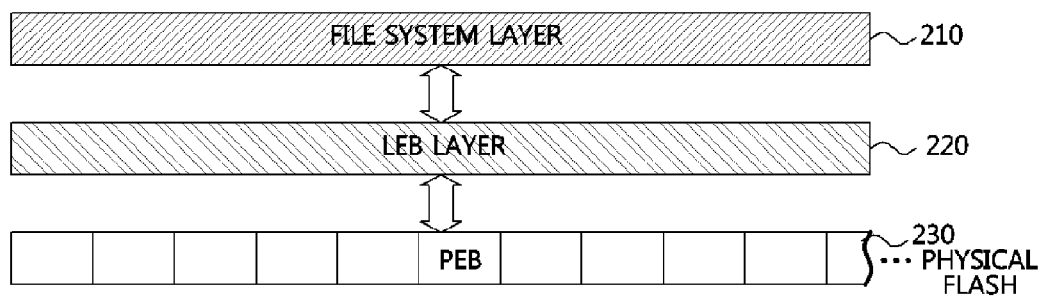
FIG. 2 illustrates a layered structure of a file system of a flash memory according to an embodiment of the present invention.

FIG. 2 illustrates a layered structure of a file system of a flash memory according to an embodiment of the present invention.

The file system includes a file system layer 210, a Logical Erase Block (LEB) layer 220, and a Physical Erase Block (PEB) layer 230. The PEB layer 230 may be a physical flash memory.

As illustrated in FIG. 2, the file system is characterized in that the LEB layer 220, which makes PEBs appear to be LEBs, is used as a lower layer of the file system.

The LEB layer 220 converts PEBs into LEBs, hides bad blocks, and performs wear-leveling of erase blocks with reference to an erase counter included in the header of each PEB.

The LEB layer 220 also makes PEBs including PEB addresses of the flash memory correspond to LEBs including LEB addresses.

Figure 3:
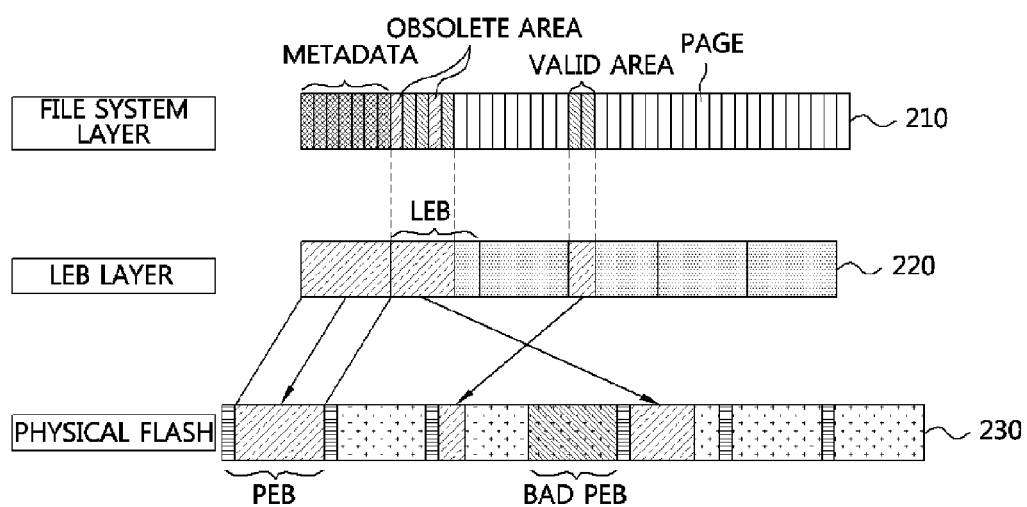
FIG. 3 illustrates a layered structure of a file system according to an embodiment of the present invention and a correlation between layers in detail.

FIG. 3 illustrates a layered structure of the file system according to an embodiment of the present invention and a correlation between layers in detail.

As described above, the LEB layer 220 is located between the file system layer 210 and the PEB layer 230.

The file system layer 210 is comprised of a plurality of blocks, and each block may include a plurality of pages, as described above.

Referring to FIG. 3, if blocks of the file system layer 210 are used, LEBs corresponding to addresses of the blocks are mapped to PEBs for storing data of the blocks.

A mapping relationship between LEBs and PEBs has no limitation, and a PEB may be mapped to an arbitrary LEB. Also, a PEB may be mapped to a specific LEB, or no PEB may be mapped to a specific LEB.

Meanwhile, the number of LEBs in a file system may be smaller than the number of PEBs in the file system. In the example of FIG. 3, there are 7 PEBs and 6 LEBs. As such, if the number of LEBs is set to be smaller than the number of PEBs, a PEB mapped to no LEB is reserved, and if a bad PEB occurs, the bad PEB may be hidden so as to re-map the corresponding PEB to the reserved PEB.

With regard to PEBs, a header 231 is stored in the first page of each PEB. The header 231 includes an erase counter and an address of an LEB mapped to the corresponding PEB. The erase counter includes information regarding the number of times that the corresponding PEB has been erased. The LEB address is written only when the corresponding PEB is mapped to the LEB, and the erase counter is used for wear-leveling. Meanwhile, a PEB may include a plurality of pages, and in the case of a large block NAND flash memory, a page is 2 KB, and 64 pages constitutes a PEB.

The LEB layer 220 performs wear-leveling in units of erase blocks, and the wear-leveling may be implemented by various methods.

A wear-leveling method according to an embodiment of the present invention may select a PEB which is less worn out by referring to an erase counter when mapping a PEB to a LEB, and may map the selected PEB to a LEB.

A wear-leveling method according to another embodiment of the present invention compares erase counter values of PEBs to a greatest erase counter value to determine whether differences between the erase counter values and the greatest erase counter value exceed a predetermined value, and moves content of a PEB which is more worn out to a PEB which is less worn out. In detail, the wear-leveling method maps LEBs to PEBs without considering erase counters, but limits differences between the erase counters of PEBs.

For example, if it is assumed that a difference between erase counters is limited to 5, the wear-leveling method moves no PEB before a PEB having an erase counter of 5 appears. If a PEB having an erase counter of 5 appears, the wear-leveling method moves content of the corresponding PEB to a PEB having a lower erase counter by referring to a table including erase counter values of PEBs. Thereby, the wear-leveling method maintains differences between erase counters of PEBs to be below 5.

The wear-leveling method has a high operating speed compared to other methods since it is unnecessary to refer to an erase counter table whenever mapping is performed.

In the current embodiment, the LEB layer 220 may be an Unsorted Block Image (UBI) included in a Linux kernel.

Figure 4:
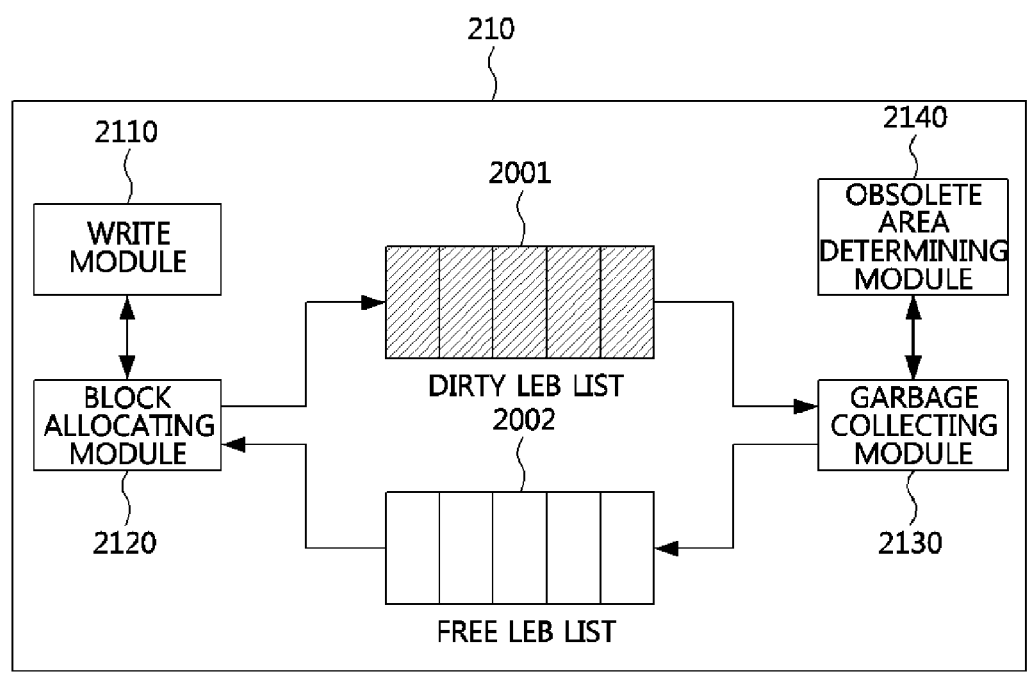
FIG. 4 is a block diagram illustrating a file system layer according to an embodiment of the present invention.

FIG. 4 is a block diagram illustrating the file system layer 210 according to an embodiment of the present invention.

Referring to FIG. 4, the file system layer 210 may include a write module 2110, a block allocating module 2120, a garbage collecting module 2130, and an obsolete area determining module 2140, and may manage a dirty LEB list 2001 and a free LEB list 2002.

The file system receives LEB information from an LEB layer, and configures the dirty LEB list 2001 and the free LEB list 2002. A free LEB is an LEB allowing writing on all pages, and a dirty LEB is an LEB which is not a free LEB.

If an LEB has been mapped, this means that the LEB is being used, and accordingly, the corresponding LEB is a dirty LEB, and otherwise, the corresponding LEB is a free LEB. According to an embodiment, the dirty LEB list 2001 and the free LEB list 2002 are created when the file system is mounted.

The garbage collecting module 2130 performs garbage collection on dirty LEBs at regular time intervals to add acquired free LEBs to the free LEB list 2002. The free LEBs acquired by the garbage collecting module 2130 are used when the write module 2110 requests the block allocating module 2120 to send a block.

Hereinafter, operations of the individual modules illustrated in FIG. 4 will be described in more detail.

Block Allocating Module

The block allocating module 2120 provides valid blocks (blocks corresponding to LEBs) of free LEBs acquired from the free LEB list 2002, in order from the headmost block. The reason for providing blocks in order is because sequential programming of a flash memory should be satisfied. LEBs having no available space are moved to the dirty LEB list 2001.

Write Module

A write module of a disk file system using in-place update is modified such that the disk file system can perform out-of-place update. The file system according to the current embodiment performs writing as follows.

Although a general disk file system is allocated no block upon updating, writing according to the present invention involves calling the block allocating module 2120 when a write request is received, and a new block is allocated. The allocated block is connected to an Mode.

If the write request is an update request for correcting existing data, this means that a block has already been allocated. In this case, the existing block is no longer used and a newly allocated block is used. Accordingly, a "not being used" status with respect to the existing block is written in a "block table", an address of the block is removed from the Mode, which is metadata of the corresponding file, and then, an address of the newly allocated block is written in the Mode.

Thereby, data is subject to out-of-place update, however, metadata is subject to in-place update since modification of an Mode, which is the metadata, is reflected in a storage unit and, accordingly, the metadata has no change in position. However, by reflecting metadata in a storage unit when synchronization is performed, instead of storing the metadata in the storage unit whenever it changes, in-place update due to modification of metadata may be minimized.

Also, a metadata area is fixed (used by allocating specific LEBs) as illustrated in FIG. 1, however, the metadata area is fixed in view of an LEB address space, and it is unnecessary to worry that only a specific area of a storage unit is worn out since PEBs mapped to LEBs continue to change through wear-leveling of the LEB layer.

Thereby, out-of-place update is possible. However, since obsolete blocks are generated upon out-of-place update, garbage collection for detecting and collecting obsolete blocks is needed. However, it is difficult to detect obsolete blocks. This is because a metadata area includes no area representing "which blocks are obsolete blocks" while including content representing "which blocks are and are not being used in a file system".

In order to overcome this problem, a method of adding "obsolete area information" representing which blocks are obsolete blocks to a metadata area can be considered. Since the write module 2110 can recognize whether an existing block is an obsolete area upon out-of-place update, "obsolete area information" may be updated upon out-of-place update. However, this method brings an overhead problem of a metadata area increasing in order to maintain "obsolete area information" in a storage unit. Accordingly, a method of determining an obsolete area based on limited information is needed.

Garbage Collecting Module

The garbage collecting module 2130 classifies LEBs included in the dirty LEB list 2001 into obsolete areas and valid areas, separately collects the valid areas, and copies them to other free LEBs.

FIG. 7 is a conceptual view for describing the garbage collection.

Referring to FIG. 7, in step 1, LEBs included in the dirty LEB list 2001 (see FIG. 4) are classified into obsolete areas and valid areas. In FIG. 7, oblique-lined areas are obsolete areas, b1, b2, b3, and b4 are valid blocks, and empty blocks constituting an area LEB C are free blocks.

In step 2, the valid areas included in LEB A and LEB B are collected and copied to another free LEB, that is, to LEB C. In other words, a free LEB is used to acquire two free LEBs.

If all the valid areas are copied, the existing valid blocks become obsolete blocks so that only obsolete blocks remain in the corresponding dirty LEBs. Then, in step 3, the garbage collecting module 2130 erases the dirty LEBs and then sends them to the free LEB list 2002. At this time, the garbage collecting module 2130 releases mapping between the existing obsolete blocks and PEBs.

Obsolete Area Determining Module

In order for the garbage collecting module 2130 to collect garbage, the garbage collecting module 2130 should detect obsolete blocks. The garbage collecting module 2130 sends LEBs to the obsolete area determining module 2140, and requests the obsolete area determining module 2140 to determine whether the LEBs are obsolete blocks.

The obsolete area determining module 2140 determines obsolete blocks based on criteria as follows.

The obsolete area determining module 2140 determines whether each of blocks constituting a dirty LEB is being used by referring to a block table. If a block is not being used, the obsolete area determining module 2140 determines that the block is an obsolete block, and if a block is being used, the obsolete area determining module 2140 determines that the block is a valid block.

The determination by the obsolete area determining module 2140 is based on the fact that an LEB mapped to no PEB is a free LEB and an LEB mapped to a PEB is a dirty LEB according to the operation principle of the present invention. A dirty LEB according to the present invention means an LEB in which at least one block has been used for writing.

As described above, the block allocating module 2120 moves only LEBs wherein storage spaces have been all used to the dirty LEB list 2001. That is, at the time at which an LEB moves to the dirty LEB list 2001, information indicating that blocks included in the LEB are being used is written in the block table. If a block "not being used" among blocks of dirty LEBs is found when the obsolete area determining module 2140 determines obsolete blocks, the block is an obsolete block discarded since it has been updated after being used once.

Figure 5:
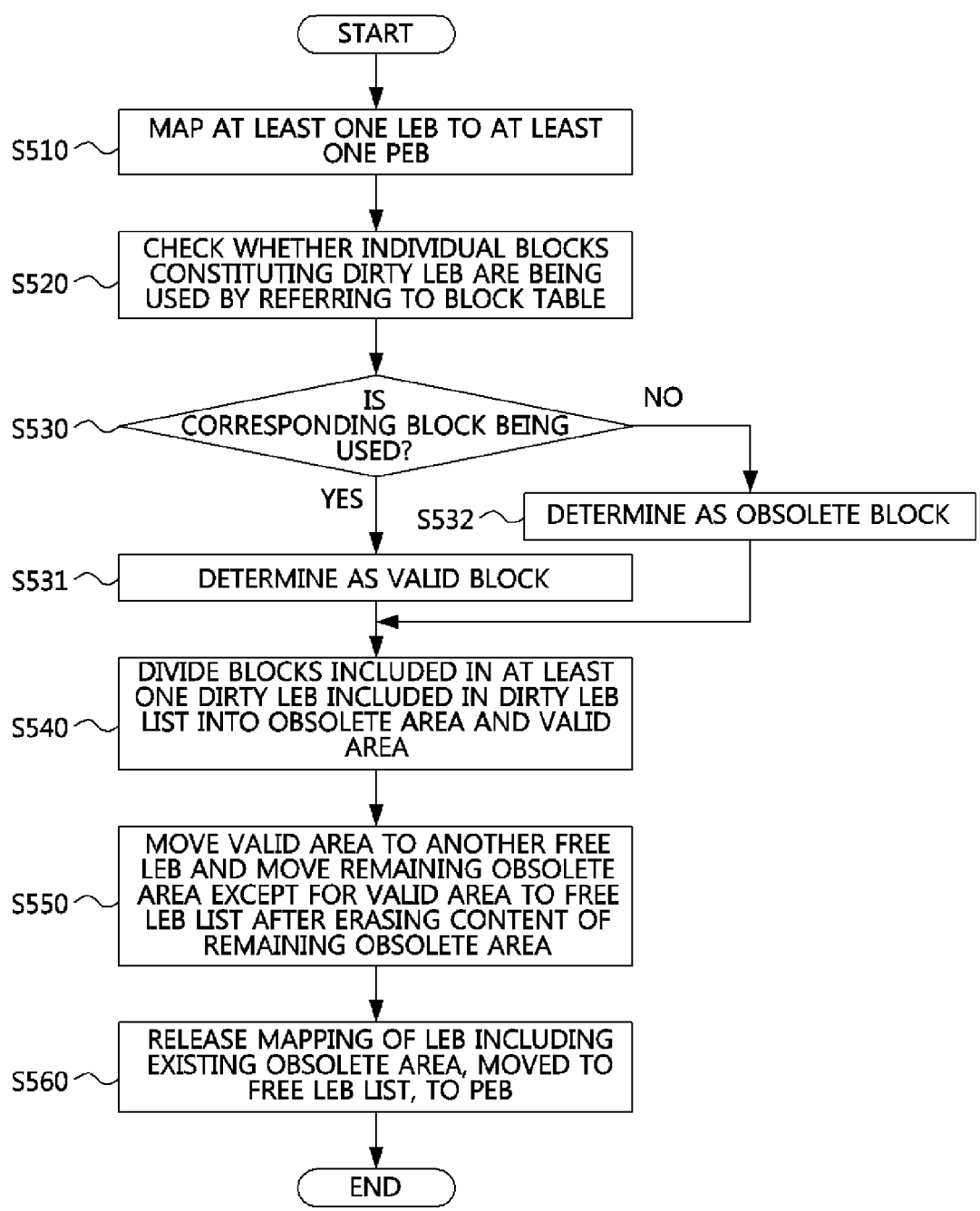
FIG. 5 is a flowchart illustrating garbage collection and associated operations in a file system management method according to an embodiment of the present invention.

FIG. 5 is a flowchart illustrating garbage collection and associated operations in a file system management method according to an embodiment of the present invention.

First, at least one LEB is mapped to at least one PEB (S510). The operation S510 may be performed for all LEBs and PEBs upon set-up. However, it is also possible to perform a minimum number of mapping operations upon set-up, and perform mapping as necessary.

For garbage collection, an operation of determining obsolete blocks is performed.

That is, it is determined whether individual blocks constituting a dirty LEB are being used based on the block table (S520) to determine whether a corresponding block is being used (S530). If the corresponding block is being used, the block is determined as a valid block (S531), and if the corresponding block is not being used, the block is determined as an obsolete block (S532).

Then, blocks included in at least one dirty LEB are classified into obsolete areas and valid areas (S540). The valid areas move to another free LEB, and the remaining obsolete areas that are not among the valid areas move to the free LEB list 2002 after content is erased from the obsolete areas (S550).

Also, mapping between an LEB including the existing obsolete areas, moved to the free LEB list 2002, and a PEB is released (S560).

Operations associated with garbage collection in the file system management method have been described above, and hereinafter, an update write operation will be described in detail with reference to FIG. 6.

FIG. 6 is a flowchart illustrating an update write operation according to an embodiment of the present invention; and According to the file system management method, if an update write request for an arbitrary first block is received (S610), a new second block is allocated instead of the first block (S620). This is aimed at allowing out-of-place update, which has been described above.

Thereafter, writing is performed on the second block in response to the write request (S630). Then, with regard to the first block which is no longer used, information indicating that the first block is no longer used is written in a block table included in metadata (S640). Also, an address of the first block is removed from an Mode of the corresponding file associated with the writing operation, and an address of the second block is written in the Mode (S650).

According to the embodiments of the present invention as described above, it is possible to reduce a mount time since metadata is fixedly stored in a specific location of a storage space, and also to write data in a flash memory based on out-of-place update while using a data storage structure capable of reducing use of a memory space.

Thereby, it is possible to maintain advantages in view of a mount time and use of a memory space while reducing performance deterioration compared to existing disk file systems. Also, the file system may be easily implemented.

In addition, the LEB layer required for operations of the present invention may be easily implemented since a UBI included in a Linux kernel has functions corresponding to the LEB layer. Also, the file system layer may be implemented by correcting an existing disk file system such as ext2.

While the example embodiments of the present invention and their advantages have been described in detail, it should be understood that various changes, substitutions and alterations may be made herein without departing from the scope of the invention.

What is claimed is:

1. An apparatus for managing a file using a logical erase block corresponding to a physical erase block, the apparatus comprising:
a block allocating module receiving available blocks of at least one free logical erase block stored in a free logical erase block list and transmits the available blocks to a write module, the at least one free logical erase block allowing writing on all pages;
a garbage collecting module receiving at least one dirty logical erase block stored in a dirty logical erase block list and sends the at least one dirty logical erase block to an obsolete area determining module, the at least one dirty logical erase block is not the at least one free logical erase block;
the write module to which is allocated, if an update write request for correcting existing data in a block of the at least one dirty logical erase block is received, one of the available blocks from the block allocating module, and writing information in a block table indicating that the block of the at least one dirty logical erase block is no longer used; and
the obsolete area determining module receiving the at least one dirty logical erase block from the garbage collecting module to determine an obsolete area in the at least one dirty logical erase block, by referring to the block table storing information about whether or not at least one block of the at least one dirty logical erase block is being used and according to whether or not the at least one dirty logical erase block is mapped to a physical erase block, and transmits the determination to the garbage collecting module.

2. The apparatus of claim 1, wherein the garbage collecting module collects garbage for the at least one dirty logical erase block included in the dirty logical erase block list, according to the result of the determination of the obsolete area.

3. The apparatus of claim 2, wherein the garbage collecting module classifies blocks included in the at least one dirty logical erase block included in the dirty logical erase block list into an obsolete area and a valid area, copies the valid area to another free logical erase block, erases the at least one dirty logical erase block which has only the obsolete area remaining, and moves the at least one dirty logical erase block to the free logical erase block list.

4. The apparatus of claim 3, wherein the garbage collecting module releases mapping between a logical erase block including an existing obsolete area, moved to the free logical erase block list, and a physical erase block.

5. The apparatus of claim 1, wherein the block allocating module sequentially provides available blocks based on the free logical erase block list, and moves a logical erase block having no available space to the dirty logical erase block list.

6. The apparatus of claim 1,
wherein the block is a block which has already been allocated and the one of the available blocks is a newly allocated block.

7. The apparatus of claim 1, wherein the obsolete area determining module checks whether individual blocks constituting a dirty logical erase block are being used by referring to the block table, and if a block is not being used, the obsolete area determining module determines the block as an obsolete block, and if a block is being used, the obsolete area determining module determines the block as a valid block.

8. The apparatus of claim 1, wherein the block table is stored in a metadata storage area.

9. The apparatus of claim 1, wherein a number of physical erase blocks included in a physical memory is greater than or equal to a number of logical erase blocks.

10. The apparatus of claim 1, wherein each physical erase block comprises an erase counter including information regarding a number of times that the corresponding physical erase block has been erased.

11. The apparatus of claim 10, wherein the erase counter is used for wear-leveling by a logical erase block layer.

12. A computer implemented method of managing a file system using a logical erase block corresponding to a physical erase block, the method comprising:
receiving available blocks of at least one free logical erase block stored in a free logical erase block list;
if an update write request for correcting existing data in a block of at least one dirty logical erase block is received:
allocating one of the available blocks of the at least one free logical erase block, and
writing information in a block table indicating that the block of the at least one dirty logical erase block is no longer used;
determining an obsolete area in the at least one dirty logical erase block, by referring to the block table storing information about whether or not at least one block of the at least one dirty logical erase block is being used and according to whether or not the at least one dirty logical erase block is mapped to a physical erase block; and
performing garbage collection for the at least one dirty logical erase block according to the result of the determination of the obsolete area,
wherein the at least one free logical erase block is a logical erase block allowing writing on all pages, and the at least one dirty logical erase block is a logical erase block that is not the at least one free logical erase block.

13. The method of claim 12, wherein the performing of the garbage collection for the at least one dirty logical erase block comprises:
classifying the at least one dirty logical erase block into an obsolete area and a valid area;
copying the valid area to another free logical erase block;
erasing the at least one dirty logical erase block which has only the obsolete area remaining; and
moving the at least one dirty logical erase block to the free logical erase block list.

14. The method of claim 13, further comprising releasing mapping between a logical erase block including an existing obsolete area, moved to the free logical erase block list, and physical erase block.

15. The method of claim 12,
wherein the block of the at least one dirty logical erase block is a block which has already been allocated and the one of the available blocks is a newly allocated block.

16. The method of claim 12, wherein the determining of the obsolete area for the at least one dirty logical erase block comprises:
checking whether individual blocks constituting the at least one dirty logical erase block are being used by referring to the block table; and
determining a corresponding block as an obsolete block if the block is not being used, and determining the block as a valid block if the block is being used.

* * * * *